United States Patent
Benazzi et al.

(10) Patent No.: US 6,235,960 B1
(45) Date of Patent: May 22, 2001

(54) PROCESS FOR IMPROVING THE POUR POINT, AND A CATALYST BASED ON AT LEAST ONE MTT, TON OR FER ZEOLITE

(75) Inventors: Eric Benazzi, Chatou; Slavik Kasztelan, Malmaison; Nathalie George-Marchal, Saint Genis Laval, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/310,181

(22) Filed: May 12, 1999

(30) Foreign Application Priority Data

May 13, 1998 (FR) .................................................. 98 06005

(51) Int. Cl.$^7$ ....................................................... C07C 5/13
(52) U.S. Cl. ......................... 585/740; 585/739; 585/750; 208/18; 208/27
(58) Field of Search .................. 208/27, 28, 18; 585/734, 739, 750, 740

(56) References Cited

U.S. PATENT DOCUMENTS

| | | | |
|---|---|---|---|
| 4,380,685 | 4/1983 | Chu | 585/466 |
| 4,585,748 | 4/1986 | Usui et al. | 502/66 |
| 5,173,461 | 12/1992 | Absil et al. | 502/62 |
| 5,525,209 | 6/1996 | Billon et al. | 208/59 |
| 5,723,716 | * 3/1998 | Brandes et al. | 585/734 |
| 5,990,371 | * 11/1999 | Martens et al. | 585/739 |
| 6,106,698 | * 8/2000 | Benazzi et al. | 208/111.3 |
| 6,136,180 | * 10/2000 | Benazzi et al. | 208/122 |

FOREIGN PATENT DOCUMENTS

| | | |
|---|---|---|
| 372632 | 11/1989 | (EP) . |
| 2758278 | 7/1998 | (FR) . |
| 2760385 | 9/1998 | (FR) . |

* cited by examiner

*Primary Examiner*—Bekir L. Yildirim
(74) *Attorney, Agent, or Firm*—Millen, White, Zelano, Branigan, P.C.

(57) ABSTRACT

A process for improving the pour point of a feed comprising paraffins containing more than 10 carbon atoms, in which the feed to be treated is brought into contact with a catalyst comprising at least one zeolite with structure type MTT, TON or FER or any possible combination of these three, at least one hydro-dehydrogenating element selected from elements from group VIB and group VIII of the periodic table, at least one deposited promoter element (boron, silicon, phosphorous), optionally at least one group VIIA element, optionally at least one group VIIB element, at a temperature in the range 170° C. to 500° C., a pressure in the range 1 to 250 bars and at an hourly space velocity in the range 0.05 to 100 h$^{-1}$, in the presence of hydrogen in an amount of 50 to 2000 l/l of feed. The oils obtained have good pour points and high viscosity indices (VI). The process is also applicable to gas oils, and other feeds requiring a reduction in pour point.

The invention also relates to a catalyst containing silicon and to its use for converting hydrocarbon-containing feeds.

19 Claims, No Drawings

PROCESS FOR IMPROVING THE POUR POINT, AND A CATALYST BASED ON AT LEAST ONE MTT, TON OR FER ZEOLITE

The present invention relates to a process for improving the pour point of feeds containing linear and/or slightly branched, long (more than 10 carbon atoms) paraffins, in particular to provide good yields on converting feeds with high pour points to at least one cut with a low pour point, and a high viscosity index for oil bases.

The catalyst used comprises at least one zeolite with structure type MTT, TON or FER or any possible combination of these types, at least one hydro-dehydrogenating element, preferably selected from elements from group VIB and group VIII of the periodic table, at least one deposited promoter element which is selected from the group formed by boron, silicon and phosphorous, optionally at least one group VIIA element, and optionally at least one group VIIB element.

The invention also relates to a catalyst as described above but containing silicon as the promoter element and optionally phosphorous and/or boron. The present invention also claims the use of this catalyst for converting hydrocarbons and a process for reducing the pour point.

BACKGROUND OF THE INVENTION

High quality lubricants are fundamentally important for the proper operation of modern machines, automobiles and trucks. However, the quantity of paraffins originating directly from untreated crude oil with properties which are suitable for use in good lubricants is very low compared to the increasing demand in this sector.

Heavy oil fractions containing large amounts of linear or slightly branched paraffins must be treated in order to obtain good quality oil bases in the best possible yields, using an operation which aims to eliminate the linear or slightly branched paraffins from feeds which are then used as base stock, or as kerosine or jet fuel.

High molecular weight paraffins which are linear or very slightly branched which are present in the oils or kerosine or jet fuel result in high pour points and thus in coagulation for low temperature applications. In order to reduce the pour points, such linear paraffins which are not or are only slightly branched must be completely or partially eliminated.

This operation can be carried out by extracting with solvents such as propane or methyl ethyl ketone, termed dewaxing, with propane or methyl ethyl ketone (MEK). However, such techniques are expensive, lengthy and not always easy to carry out.

A further technique is selective cracking of the longest linear paraffin chains to form compounds with a lower molecular weight, part of which can be eliminated by distillation.

Because of their form selectivity, zeolites are among the most widely used catalysts. The idea underlying their use is that zeolite structures exist which have pore openings which allow long linear or very slightly branched paraffins to enter their micropores but which exclude branched paraffins, naphthenes and aromatic compounds. This phenomenon leads to selective cracking of linear or very slightly branched paraffins.

Zeolite based catalysts with intermediate pore sizes such as ZSM-5, ZSM-11, ZSM-12, ZSM-22, ZSM-23, ZSM-35 and ZSM-38 have been described for their use in such processes.

Processes using such zeolites (ZSM-5, ZSM-11, ZSM-12, ZSM-22, ZSM-23, ZSM-35 and ZSM-38) can produce oils by cracking feeds containing less than 50% by weight of linear or linear or very slightly branched paraffins. However, for feeds containing higher quantities of these compounds, it has become apparent that cracking them leads to the formation of large quantities of products with lower molecular weights such as butane, propane, ethane and methane, which considerably reduces the yield of desired products.

SUMMARY OF THE INVENTION

In order to overcome these disadvantages, we have concentrated our research on developing catalysts containing at least one zeolite with a structure type MTT, TON, or FER or any possible combination of these types, preferably also containing at least one element selected from elements from group VIB and VIII of the periodic table, boron and/or silicon, optionally phosphorous, and optionally at least one group VIIA element also encouraging isomerization of these compounds.

The present invention proposes a catalytic process for reducing the pour point based on such catalysts.

In a first aspect, the invention provides a process for improving the pour point of a paraffin feed comprising paraffins containing more than 10 carbon atoms, in which the feed to be treated is brought into contact with a catalyst containing at least one zeolite with structure type MTT, TON, or FER or any possible combination of these types, at least one hydro-dehydrogenating element, preferably selected from elements from group VIB and group VIII of the periodic table, at least one deposited promoter element selected from the group formed by boron, silicon and phosporous, optionally at least one group VIIA element, and optionally at least one group VIIB element, at a temperature in the range 170° C. to 500° C., a pressure in the range 1 to 250 bars and at an hourly space velocity in the range 0.05 to 100 $h^{-1}$, in the presence of hydrogen in an amount of 50 to 2000 l/l of feed.

The zeolites comprised in the catalyst of the invention have structure types TON, MTT or FER and are described in the "Atlas of Zeolite Structure Types, W. M. Meier, D. H. Olson and Ch. Baerlocher, $4^{th}$ Revised Edition, 1996, Elsevier.

The catalyst has an activity and dewaxing selectivity (improving the pour point) which is higher than the catalytic formulae based on known MTT, TON and FER zeolites. Without wishing to be bound by a particular theory, it appears that this particularly high activity of the catalysts of the present invention is due to reinforcement of the acidity of the catalyst by the presence of the promoter element, in particular boron and/or silicon, in the matrix which results in the improvement in the properties with respect to catalysts in current use.

The process can advantageously convert a feed with a high pour point to a product with a lower pour point. It can thus be applied to reducing the pour point of gas oils, for example. It can also convert heavier feeds to oils with a high viscosity index.

Among others, the feed is composed of linear and/or slightly branched paraffins containing at least 10 carbon atoms, preferably 15 to 50 carbon atoms, and advantageously 15 to 40 carbon atoms. Heavy feeds (to produce oils) comprise paraffins essentially containing more than 30 carbon atoms; gas oils generally contain paraffins containing 10–30 carbon atoms.

The isomerised products present in the final products may contain about 65% to 80% of single-branched products and about 20% to 35% of multi-branched products. The term "single-branched products" means linear paraffins comprising a single methyl group, and the term "two-branched products" means linear paraffins containing 2 methyl groups which are not carried by the same carbon atom. Thus "multi-branched" paraffins can be defined by extension.

Further, the catalyst comprises at least one hydro-dehydrogenating function, for example a group VIII metal (noble or non-noble) or a combination of at least one group VIII (non noble) metal or compound and at least one group VI metal or compound, and the reaction is carried out under conditions which will be described below.

Using the catalyst of the invention under the conditions described above can produce products with a low pour point in good yields, and oils with a high viscosity index.

DETAILED DESCRIPTION OF THE INVENTION

A zeolite with structure type TON includes the following zeolites: theta, ISI-1, NU-10, KZ-2 and ZSM-22 (described in U.S. Pat. No. 4,810,357). A zeolite with structure type MTT includes ZSM-23 zeolites (described in U.S. Pat. Nos. 4,076,842 and 4,104,141), EU-13, ISI-4, KZ-1 and SSZ-32 (described in U.S. Pat. No. 5,053,373). A zeolite with structure type FER includes the following zeolites which essentially have the same structure: ferrierite, FU-9, NU-23, ZSM-35 (described in U.S. Pat. No. 4,016,245), and ISI-6.

The MTT, TON and FER zeolites used in the catalyst of the invention can also be prepared in a fluoride medium. Preferred zeolites are NU-10, EU-13, NU-23.

The global Si/Al ratio of the zeolites forming part of the composition of the catalysts of the invention and the chemical composition of the samples are determined using X ray fluorescence and atomic absorption.

The Si/Al ratios of the zeolites described above are those obtained on synthesis using the operating procedures described in the various cited documents or obtained following post-synthesis dealumination treatments which are well known to the skilled person, non exhaustive examples of which are hydrothermal treatments followed or otherwise by acid attack or direct acid attack using solutions of mineral or organic acids.

The zeolites forming part of the compositions of the catalysts of the invention are calcined and exchanged in at least one treatment using a solution of at least one ammonium salt so as to obtain the ammonium form of the zeolites which, once calcined, result in the hydrogen form of the zeolites.

The zeolites forming part of the composition of the catalyst of the invention are at least in part, preferably practically completely, in the acid form, i.e., in the hydrogen form ($H^+$). The Na/T atomic ratio is generally less than 10%, preferably less than 5%, and more preferably less than 1%.

The catalyst of the invention contains at least one zeolite with structure type MTT, TON or FER or any possible combination of those types mixed with a matrix, and optionally at least one hydro-dehydrogenating element, which is preferably a noble metal or a combination of at least one group VI metal or compound and at least one group VIII metal or compound.

When the hydro-dehydrogenating element is at least one group VIII metal, preferably a noble metal and advantageously selected from the group formed by Pt and Pd, it is introduced into the molecular sieve by dry impregnation, for example, by ion exchange or by any other method which is known to the skilled person, or it is introduced into the matrix.

The catalyst of the present invention generally comprises, in % by weight with respect to the total catalyst weight, at least one metal selected from the following groups and in the following amounts:

0.1% to 60%, preferably 0.1% to 50%, and more preferably 0.1% to 40%, of at least one hydro-dehydrogenating metal, preferably selected from the group VIB and group VIII (as % of oxide);

0.1% to 99.7%, preferably 1% to 99%, of at least one amorphous or low crystallinity oxide type matrix;

0.1% to 90%, preferably 0.1% to 80%, more preferably still 0.1% to 70%, of at least one zeolite with structure type TON, MTT, or FER as defined above;

said catalyst being characterized in that it also comprises:

0.1% to 20%, preferably 0.1% to 15%, still more preferably 0.1% to 10%, of deposited promoter element (as % of oxide) selected from the group formed by B, Si and P;

0 to 20% of at least one group VIIB element (as % of oxide), preferably manganese or rhenium;

0 to 20% by weight, preferably 0.1% to 15%, more preferably 0.1% to 10%, of at least one halogen, preferably fluorine.

A preferred catalyst of the invention contains boron and/or silicon as the promoter element and optionally 0 to 20%, preferably 0.1% to 15%, more preferably 0.1% to 10%, of phosphorous (as % oxide).

A more preferred catalyst contains silicon as the promoter element. Phosphorous and/or boron can optionally be present.

The catalyst of the invention thus generally and globally comprises 0.1% to 65% (weight of oxide), preferably 0.1% to 60%, and advantageously 0.1% to 55% of silicon (contained in the zeolite framework+deposited silicon which is in its amorphous form and generally principally located on the matrix).

The group VIB metals and group VIII metals of the catalyst of the present invention can be completely or partially present in the metallic and/or oxide and/or sulfide form.

The hydrogenating function is ensured by at least one element from groups VIB or VIII. Molybdenum and tungsten are preferred group VIB elements.

When the catalyst comprises a group VIII hydrogenating metal, preferably a noble metal and advantageously Pt and/or Pd, the catalyst is reduced in the reactor in the presence of the hydrogen and under conditions which are well known to the skilled person.

The amount of metal thus introduced, expressed as the % by weight with respect to the mass of molecular sieve employed, is generally less than 5%, preferably less than 3%, and the noble metal content in the catalyst is generally less than 2% by weight.

When the hydrogenating metal is from group VIII, preferably Pt and/or Pd, it can also very advantageously be deposited on the support using any process which is known to the skilled person which can deposit metal on the molecular sieve. Competitive cation exchange can be used, with ammonium nitrate as the preferred competing agent, the competition ratio being at least about 20 and advantageously about 30 to 200. When platinum or palladium is used, a platinum tetramine complex or a palladium tetramine complex is normally used: these latter are then almost completely deposited on the molecular sieve. This cation exchange technique can also be used to deposit the metal directly on powdered molecular sieve before mixing it with any matrix.

Deposition of the group VIII metal(s) is generally followed by calcining in air or oxygen, usually between 300° C. and 600° C. for 0.5 to 10 hours, preferably between 350° C. and 550° C. for 1 to 4 hours. Reduction in hydrogen can then follow, generally at a temperature which is in the range 300° C. to 600° C. for 1 to 10 hours, preferably in the range 350° C. to 550° C. for 2 to 5 hours.

The platinum and/or palladium can also be deposited not directly on the molecular sieve, but on the matrix (alumina binder) before or after forming, by anion exchange with hexachloroplatinic acid, hexachloropallaic acid and/or palladium chloride in the presence of a competing agent, for example hydrochloric acid. As before, after depositing the platinum and/or palladium, the catalyst is generally calcined then reduced in hydrogen as indicated above.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention can comprise a group VIII metal such as iron, ruthenium, rhodium, palladium, osmium, iridium or platinum, and preferably cobalt or nickel. Advantageously, the following combinations of non noble GVI-GVIII metals are used: nickel-molybdenum, cobalt-molybdenum, iron-molybdenum, iron-tungsten, nickel-tungsten, cobalt-tungsten. Preferred combinations are: nickel-molybdenum and nickel-tungsten. It is also possible to use combinations of three metals, for example nickel-cobalt-molybdenum.

The sources of the group VIII elements which can be used are well known to the skilled person. Examples are nitrates, sulphates, phosphates, halides, for example chlorides, bromides and fluorides, and carboxylates, for example acetates and carbonates.

The catalyst of the invention can comprise at least one group VIIB element such as manganese, technetium, or rhenium; manganese and rhenium are preferred.

Sources of the group VIIB element which can be used are well known to the skilled person. Preferably, ammonium salts, nitrates and chlorides are used.

The catalyst of the present invention thus also comprises at least one amorphous or low crystallinity porous mineral matrix, generally an oxide. Non limiting examples are aluminas, silicas, silica-aluminas. Aluminates can also be used. Preferably, matrices containing alumina in any of its forms which are known to the skilled person, preferably gamma alumina, are used.

Advantageously, mixtures of alumina and silica and mixtures of alumina and silica-alumina can also be used.

The promoter element (P, B, Si) is deposited on the catalyst. It has been introduced onto the support containing at least the zeolite and the matrix, and also preferably containing the hydrogenating metal or metals.

The promoter element, in particular silicon introduced onto the support of the invention, is principally located on the matrix of the support and can be characterized by techniques such as a Castaing microprobe (distribution profile of the various elements), transmission electron microscopy coupled with X ray analysis of the catalyst components, or by producing a distribution map of the elements present in the catalyst by electronic microprobe. These local analyses can furnish the location of the various elements, in particular that of the promoter element, in particular that of the amorphous silica on the support matrix due to introduction of the silicon promoter in accordance with the invention. The location of the silicon on the framework of the zeolite contained in the support is also revealed. Further, a quantitative estimate of the local silicon contents or other promoter elements can be carried out.

In addition, $^{29}Si$ NMR with magic angle spinning is a technique which can detect the presence of the amorphous silica introduced into the catalyst using the procedure described in the present invention.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

Molybdenum impregnation can be facilitated by adding phosphoric acid to ammonium paramolybdate solutions, which enables phosphorous to be introduced as well to promote the catalytic activity. Other phosphorous compounds can be used, as is well known to the skilled person.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_5$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can be added, for example, by impregnation using an emulsion of a silicone in water.

The catalyst of the invention can also comprise at least one halogen, preferably fluorine.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating with an aqueous hydrofluoride solution or ammonium fluoride.

The promoter element and optional element selected from group VIIA, the halogens, can be introduced by impregnation into the catalyst at various stages of the preparation and in various ways.

In general, a mixture is prepared containing at least one matrix, a beta zeolite, and optionally at least one hydrogenating metal selected from group VIII and group VIB metals. The mixture may be formed or not. It can optionally contain at least one group VIIB element.

The mixture (with at least one solution containing at least one promoter element and optionally a halogen) is preferably impregnated using the "dry" impregnation method which is well known to the skilled person. Impregnation can be carried out in a single step using a solution containing all of the constituent elements of the final catalyst, or by one or more impregnation operations, for example with an excess of solution, onto the calcined precursor.

When the catalyst contains boron, one preferred method of the invention consists of preparing an aqueous solution of at least one boron salt such as ammonium biborate or ammonium pentaborate in an alkaline medium and in the presence of hydrogen peroxide and carrying out dry impregnation, in which the pore volume of the precursor is filled with the solution containing boron.

When the catalyst contains silicon, a solution of a silicone type silicon compound is preferably used.

When the catalyst contains boron and silicon, boron and silicon can also be deposited simultaneously using a solution containing a boron salt and a silicone type silicon compound. Thus, for example (and in the preferred case where the precursor is a nickel-molybdenum type catalyst on a support containing a zeolite and an alumina), for example, it is possible to impregnate this precursor with an aqueous solution of ammonium biborate and Rhodorsil E1P silicone from Rhône Poulenc, to dry at 80° C., for example, then to impregnate with an ammonium fluoride solution, then dry at 80° C., for example, followed by calcining, preferably in air in a traversed bed, for example at 500° C. for 4 hours.

When the catalyst contains at least one group VIIA element, the mixture is impregnated with at least one solution of at least one element from group VIIA before, after or simultaneously with impregnation with a solution of the promoter element. It is possible, for example, to impregnate the catalyst with a solution of ammonium fluoride, to dry at 80° C., for example, then to calcine, preferably in air in a traversed bed, for example at 500° C. for 4 hours.

Other impregnation sequences can be carried out to obtain the catalyst of the present invention.

When the catalyst contains a deposited group VIIB element, the mixture is impregnated using at least one solution of at least one group VIIB element before, after or simultaneously with impregnation with the solution of the promoter element.

When the metals are introduced in a plurality of steps for impregnating the corresponding precursor salts, an intermediate drying step is generally carried out on the catalyst at a temperature generally in the range 60° C. to 250° C.; advantageously an intermediate calcining step is generally carried out on the catalyst at a temperature in the range 150° C. to 800° C. generally in the range 250° C. to 600° C.

Generally, in order to finish the catalyst preparation, the moist solid is left in a moist atmosphere at a temperature in the range 10° C. to 80° C., then the moist solid obtained is dried at a temperature in the range 60° C. to 150° C., and finally the solid obtained is calcined at a temperature in the range 150° C. to 800° C., generally in the range 250° C. to 600° C.

A preferred catalyst of the invention contains boron and silicon, and advantageously it also contains phosphorous. Preferably, it also contains nickel and molybdenum or cobalt and molybdenum, or nickel and tungsten.

Preferably, a NiMo or NiMoP catalyst on a support comprising a mixture of alumina and beta zeolite is impregnated with an aqueous boron solution then with an aqueous silicon solution (or the reverse, a silicon solution then a boron solution) or it is impregnated with an aqueous solution containing both boron and silicon.

It is thus possible to impregnate with the solution containing the silicon, to dry, calcine and impregnate with the solution containing boron, to dry and then carry out the final calcining step.

It is also possible to impregnate with the solution containing the boron, to dry, to calcine then impregnate with the solution containing the silicon, to dry and then carry out the final calcining step.

It is also possible to impregnate the precursor with a solution containing phosphorous, to dry then calcine, then impregnate the solid obtained with the solution containing the boron, to dry, calcine then impregnate with the solution containing the silicon, to dry and then carry out the final calcining step.

More particularly, a process for preparing the catalyst of the present invention comprises the following steps:
a) preparing a mixture hereinafter termed the precursor, comprising at least the following compounds: at least one amorphous or low crystallinity porous matrix, at least one zeolite, at least one element from group VIB, and optionally at least one element from group VIII, optionally at least one element from group VIIB, and optionally phosphorous, the whole preferably being formed and dried;
b) impregnating the precursor defined in step a) with an aqueous solution containing boron and/or silicon, optionally phosphorous and optionally at least one group VIIA element;
then drying and calcining to complete the process. Advantageously, the process is completed as follows:
c) leaving the moist solid in a moist atmosphere at a temperature in the range 10° C. to 80° C.
d) drying the moist solid obtained in step b) at a temperature in the range 60° C. to 150° C.;
e) calcining the solid obtained from step c) at a temperature in the range 150° C. to 800° C.

Step b) above can be carried out using conventional methods known to the skilled person.

Step b) requires an aqueous solution containing boron and/or silicon to be deposited and thus is different from conventional methods for depositing B and/or Si which are known to the skilled person. One preferred method of the invention consists of preparing an aqueous solution of at least one boron salt such as ammonium biborate or ammonium pentaborate in an alkaline medium and in the presence of hydrogen peroxide and introducing a silicone type silicon compound into the solution and then dry impregnating, wherein the pore volume in the precursor is filled with the solution containing B and Si. This method of depositing B and Si is better than the conventional method using an alcoholic solution of boric acid or a solution of ethyl orthosilicate in alcohol.

The hydro-dehydrogenating element is introduced after calcining (by impregnation) if it has not been introduced during step a).

The catalysts of the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 $m^2/g$, the pore volume measured using a mercury porisimeter is in the range 0.2 to 1.5 $cm^3/g$ and the pore size distribution may be unimodal, bimodal or polymodal.

The catalysts of the present invention can optionally undergo sulphuration to transform at least at portion of the metallic species into the sulfide before bringing them into contact with the feed to be treated. This sulfuration activation treatment is well known to the skilled person and can be carried out using any method described in the literature.

For non noble metals, a well known conventional sulfuration technique consists of heating in the presence of hydrogen sulfide to a temperature in the range 150° C. to 800° C., preferably in the range 250° C. to 600° C., generally in a traversed bed reaction zone.

The catalyst of the invention is used for hydrocarbon conversion, in particular in a process for reducing the pour point as defined above.

Feeds which can be treated using the process of the invention are advantageously fractions with relatively high pour points the values of which are to be reduced.

The process of the invention can be used to treat a variety of feeds, from relatively light fractions such as kerosines and jet fuels to feeds with higher boiling points such as middle distillates, vacuum residues, gas oils, middle distillates from FCC (LCO and HCO) and hydrocracking residues.

The feed to be treated is, for the most part, a $C_{10}^+$ cut with an initial boiling point of more than about 175° C., preferably a heavy cut with a boiling point of at least 280° C., advantageously a boiling point of at least 380° C. The process of the invention is particularly suitable for treating paraffinic distillates such as middle distillates which encompass gas oils, kerosines, jet fuels, vacuum distillates and all other fractions with a pour point and viscosity which must be adapted to satisfy specifications.

Feeds which can be treated using the process of the invention can contain paraffins, olefins, naphthenes, aromatics and heterocycles and have a high proportion of high molecular weight n-paraffins and very slightly branched paraffins also of high molecular weight.

The reaction is carried out so that the cracking reactions remain sufficiently low to render the process economically viable. The amount of cracking reactions is generally below 40% by weight, preferably below 30%, and advantageously below 20%.

Typical feeds which can advantageously be treated by the process of the invention generally have a pour point of more than 0° C. The products resulting from treatment in accordance with the process have pour points of below 0° C., preferably below about −10° C.

These feeds contain amounts of n-paraffins and very slightly branched paraffins containing more than 10 carbon atoms, also with high molecular weight, of over 30% and up to about 90%, and in some cases more than 90% by weight. The process is of particular interest when this proportion is at least 60% by weight.

Non limiting examples of other feeds which can be treated in accordance with the invention are bases for lubricating oils, synthesized paraffins from the Fischer-Tropsch process, high pour point polyalphaolefins, synthesized oils, etc. The process can also be applied to other compounds containing an n-alkane chain such as those defined above, for example n-alkylcycloalkanes, or containing at least one aromatic group.

The feeds described above can have added to them one or more sulfur compounds, a non limiting example of which is dimethyldisulphide (DMDS).

The process is carried out under the following operating conditions:
- the reaction temperature is in the range 170° C. to 500° C., preferably in the range 180° C. to 470° C., advantageously 190° C. to 450° C.;
- the pressure is in the range 1 to 250 bar, preferably in the range 10 to 200 bar;
- the hourly space velocity (HSV, expressed as the volume of feed injected per unit volume of catalyst per hour) is in the range about 0.05 to about 100, preferably about 0.1 to about 30 h$^{-1}$.

The feed and the catalyst are brought into contact in the presence of hydrogen. The amount of hydrogen used, expressed in liters of hydrogen per liter of feed, is in the range 50 to about 2000 liters of hydrogen per liter of feed, preferably in the range 100 to 1500 liters of hydrogen per liter of feed.

The quantity of nitrogen compounds in the feed to be treated is preferably less than about 200 ppm by weight, more preferably less than 100 ppm by weight. The sulfur content is below 1000 ppm by weight, preferably less than 500 ppm, more preferably less than 200 ppm by weight. The quantity of metals in the feed, such as Ni or V, is extremely low, i.e., less than 50 ppm by weight, preferably less than 10 ppm by weight and more preferably less than 2 ppm by weight.

The compounds obtained using the process of the invention may be single-branched, two-branched and multi-branched compounds, advantageously with methyl groups.

EXAMPLES

The following examples illustrate the invention without limiting its scope.

Example 1

Preparation of a Support Containing a NU-10 Zeolite with Structure Type TON

Large quantities of a catalyst for improving the pour point containing a NU-10 zeolite with structure type TON were produced so as to enable different catalysts based on the same support to be prepared. To this end, 45.2% by weight of a NU-10 zeolite was used which had a total Si/Al ratio (measured by X ray fluorescence) of 30.2, an atomic ratio measured by atomic adsorption of Na/Al=0.005, which was mixed with 54.8% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in the moist air containing 7.5% by volume of water. Cylindrical extrudates 1.2 mm in diameter were obtained with a specific surface area of 215 m$^2$/g, a pore volume of 0.62 cm$^3$/g and a monomodal pore size distribution centred on 10 nm. An X ray diffraction analysis of the matrix revealed that it was composed of low crystallinity cubic gamma alumina and NU-10 zeolite with structure type TON. This support was designated C1.

Example 2

Preparation of Catalysts for Improving the Pour Point, Containing a NU-10 Zeolite The extrudates obtained in Example 1 were impregnated with an aqueous solution comprising ammonium biborate so as to deposit about 1.6% by weight of $B_2O_3$. After ageing at room temperature in a water-saturated atmosphere, the impregnated extrudates were dried overnight at 120° C. then calcined at 550° C. in dry air. A silicon doped support, C1B, was obtained. A further support C1Si was obtained using the same procedure as the doped support C1B, replacing the boron precursor in the impregnation solution with Rhodorsil EP1 silicone emulsion so as to deposit 2% by weight of $SiO_2$. Finally, a support C1BSi was obtained using the same procedure as the above catalysts but using an aqueous solution comprising ammonium biborate and Rhodorsil EP1 silicone emulsion and the same operating conditions. A further doped support was prepared by adding fluorine by dry impregnation using a dilute hydrofluoric acid solution so as to deposit about 1% by weight of fluorine onto support C1BSi. After drying overnight at 120° C. and calcining at 550° C. for 2 hours in dry air, doped support C1BSiF was obtained.

The supports C1, C1B, C1Si, C1BSi and C1BSiF prepared above were then dry impregnated with a solution of platinum tetramine chloride [Pt(NH$_3$)$_4$]Cl$_2$, then calcined again in air at 550° c. The final platinum content for the finished catalysts, Pt-C1, Pt-C1B, Pt-C1Si, Pt-C1BSi and Pt-C1BSiF, was about 0.6% by weight with respect to the total catalyst weight.

The compositions of the catalysts thus prepared are shown in Table 1.

TABLE 1

Characteristics of Pt-C1 catalysts

| Catalyst | Pt-C1 | Pt-C1B | Pt-C1Si | Pt-C1BSi | Pt-C1BSiF |
|---|---|---|---|---|---|
| $B_2O_3$ (wt %) | 0 | 1.5 | 0 | 1.6 | 1.4 |
| $SiO_2$ (wt %) total | 43.5 | 42.8 | 44.4 | 43.7 | 43.3 |
| F (wt %) | 0 | 0 | 0 | 0 | 0.95 |
| Pt (wt %) | 0.66 | 0.68 | 0.67 | 0.69 | 0.69 |
| Complement to 100%, mainly composed of $Al_2O_3$ (wt %) | 55.84 | 55.02 | 54.93 | 54.01 | 53.66 |

Example 3

Evaluation of Catalysts on Improving the Pour Point of a Hydrocracking Residue

The catalyst was evaluated by treating a hydrocracking residue from a vacuum distillate, to prepare an oil base.

The feed had the following characteristics:

| | |
|---|---|
| Sulphur content (ppm by weight) | 21 |
| Nitrogen content (ppm by weight) | 3 |
| Pour point (° C.) | 438 |
| Initial boiling point | 321 |
| 10% | 385 |
| 50% | 449 |
| 90% | 531 |
| End point | 556 |

The catalyst had been reduced in hydrogen at 450° C. before the catalytic test, in situ in the reactor. This reduction was carried out in stages. It consisted of a stage at 150° C. for 2 hours, then an increase of the temperature to 450° C. During this reduction procedure, the of 1° C./min, then a stage of 2 hours at 450° C. During this reduction procedure, the hydrogen flow rate was 1000 liters of $H_2$ per liter of catalyst.

The operating conditions under which the catalytic tests were carried out were as follows: a total pressure of 12 MPa, an hourly space velocity of 1.2 $h^{-1}$, and a hydrogen flow rate of 1000 liters of $H_2$ per liter of feed. The reaction temperatures to obtain 40% gross conversion of 380° compounds are shown in Table 2.

The gross conversion is expressed as follows:

Gross conversion=(weight % of 380° in effluents−weight % of 380° in feed)/(weight % of 380° in feed)

TABLE 2

Conversion temperature to obtain 40% gross conversion

| | Pt-C1 | Pt-C1B | Pt-C1Si | Pt-C1BSi | Pt-C1BSiF |
|---|---|---|---|---|---|
| T ° C. | 380 | 378 | 377 | 374 | 371 |

Table 2 shows that the catalysts of the invention, Pt-C1B, Pt-C1Si; Pt-C1BSi and Pt-C1BSiF, are more active than non doped catalyst Pt-C1.

Table 3 shows the yields for oil bases for a pour point of −15° C.

TABLE 3

Oil yield (weight %) for pour point of −15° C.

| | Pt-C1 | Pt-C1B | Pt-C1Si | Pt-C1BSi | Pt-C1BSiF |
|---|---|---|---|---|---|
| Oil yield (weight %) | 82 | 83 | 84 | 87 | 88 |

Table 3 shows that the catalysts of the invention, Pt-C1B, Pt-C1Si, Pt-C1BSi and Pt-C1BSiF, lead to higher oil yields than non doped catalyst Pt-C1.

Example 4

Preparation of a Support Containing a ZSM-23 Zeolite with Structure Type MTT

Large quantities of a catalyst for improving the pour point containing a ZSM-23 zeolite with structure type MTT were produced so as to enable different catalysts based on the same support to be prepared. To this end, 40.2% by weight of a ZSM-23 zeolite was used which had a total Si/Al ratio (measured by X ray fluroescence) of 35.2, an atomic ratio measured by atomic adsorption of Na/Al=0.004, which was mixed with 59.8% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 290 $m^2/g$, a pore volume of 0.62 $cm^3/g$ and a monomodal pore size distribution centered on 11 nm. An X ray diffraction analysis of the matrix revealed that it was composed of low crystallinity cubic gamma alumina and ZSM-23 zeolite with structure type MTT. This support was designated C2.

Example 5

Preparation of Catalysts for Improving the Pour Point, Containing a ZSM-23 Zeolite The extrudates obtained in Example 4 were impregnated with an aqueous solution comprising ammonium biborate. After ageing at room temperature in a water-saturated atmosphere, the impregnated extrudates were dried overnight at 120° C. then calcined at 550° C. in dry air. A silicon doped support, C2B, was obtained. A further support C2Si was obtained using the same procedure as the doped support C2B, replacing the boron precursor in the impregnation solution with Rhodorsil EP1 silicone emulsion. Finally, a support C2BSi was obtained using the same procedure as the above catalysts but using an aqueous solution comprising ammonium biborate and Rhodorsil EP1 silicone emulsion and the same operating conditions. A further doped support was prepared by adding fluorine by dry impregnation using a dilute hydrofluoric acid solution so as to deposit about 1% by weight of fluorine onto support C1BSi. After drying overnight at 120° C. and calcining at 550° C. for 2 hours in dry air, doped support C2BSiF was obtained.

The supports C2, C2B, C2Si, C2BSi and C2BSiF prepared above were then dry impregnated with a solution of platinum tetramine chloride $[Pt(NH_3)_4]Cl_2$, then calcined again in air at 550° C. The final platinum content for the finished catalysts, Pt-C2, Pt-C2B, Pt-C2Si, Pt-C2BSi and Pt-C2BSiF, was about 0.6% by weight with respect to the total catalyst weight.

The compositions of the catalysts thus prepared are shown in Table 4.

TABLE 4

Characteristics of Pt-C2 catalysts

| Catalyst | Pt-C2 | Pt-C2B | Pt-C2Si | Pt-C2BSi | Pt-C2BSiF |
|---|---|---|---|---|---|
| $B_2O_3$ (wt %) | 0 | 1.8 | 0 | 1.3 | 1.7 |
| $SiO_2$ (wt %) total | 38.8 | 38.1 | 39.7 | 39.2 | 38.8 |
| F (wt %) | 0 | 0 | 0 | 0 | 0.92 |
| Pt (wt %) | 0.70 | 0.66 | 0.68 | 0.65 | 0.67 |
| Complement to 100%, mainly composed of $Al_2O_3$ (wt %) | 60.5 | 59.44 | 59.62 | 58.85 | 57.91 |

Example 5

Comparison of Catalysts on Improving the Pour Point of a Hydrocracking Residue

The catalyst was evaluated by treating a hydrocracking residue from a vacuum distillate, to prepare an oil base.

The feed used was that described in Example 3.

The catalyst had been reduced in hydrogen at 450° C. before the catalytic test, in situ in the reactor. This reduction was carried out in stages. It consisted of a stage at 150° C. for 2 hours, then an increase of the temperature to 450° C. at a rate of 1° C./min, then a stage of 2 hours at 450° C. During this reduction procedure, the hydrogen flow rate was 1000 liters of $H_2$ per liter catalyst.

The operating conditions under which the catlaytic tests were carried out were as follows: a total pressure of 12 MPa, an hourly space velocity of 1.2 $h^{-1}$, and a hydrogen flow rate of 1000 liters of $H_2$ per liter of feed. The reaction temperatures to obtain 40% gross conversion of 380° compounds are shown in Table 2.

The gross conversion is as defined in Example 3.

TABLE 5

Conversion temperature to obtain 40% gross conversion

|  | Pt-C2 | Pt-C2B | Pt-C2Si | Pt-C2BSi | Pt-C2BSiF |
|---|---|---|---|---|---|
| T ° C. | 376 | 375 | 374 | 371 | 369 |

Table 5 shows that the catalysts of the invention, Pt-C1B, Pt-C1Si, Pt-C1BSi and Pt-C1BSiF are more active than non doped catalyst Pt-C1.

Table 6 shows the yields for oil bases for a pour point of −15° C.

TABLE 6

Oil yield (weight %) for pour point of −15° C.

|  | Pt-C2 | Pt-C2B | Pt-C2Si | Pt-C2BSi | Pt-C2BSiF |
|---|---|---|---|---|---|
| Oil yield (weight %) | 80 | 82 | 83 | 85 | 87 |

Table 6 shows that the catalysts of the invention Pt-C2B, Pt-C2Si, Pt-C2BSi and Pt-C2BSiF, lead to higher oil yields than non doped catalyst Pt-C2.

Example 6

Preparation of a Support Containing a Ferrierite Zeolite with Structure Type FER Large quantities of a catalyst for improving the pour point containing a ferrierite zeolite with structure type FER were produced so as to enable different catalysts based on the same support to be prepared. To this end, 49.6% by weight of a ferrierite zeolite was used which had a total Si/Al ratio (measured by X ray fluorescence) of 9.9, an atomic ratio measured by atomic adsorption of Na/Al=0.006, which was mixed with 50.4% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 220 $m^2/g$, a pore volume of 0.4 $cm^3/g$ and a monomodal pore size distribution centred on 10 nm. An X ray diffraction analysis of the matrix revealed that it was composed of low crystallinity cubic gamma alumina and ferrierite zeolite with structure type FER. This support was designated C3.

Example 7

Preparation of Catalysts for Improving the Pour Point, Containing a Ferrierite Zeolite The extrudates obtained in Example 6 were impregnated with an aqueous solution comprising ammonium biborate. After ageing at room temperature in a water-saturated atmosphere, the impregnated extrudates were dried overnight at 120° C. then calcined at 550° C. in dry air. A silicon doped support, C3B, was obtained. A further support C3Si was obtained using the same procedure as the doped support C3B, replacing the boron precursor in the impregnation solution with Rhodorsil EP1 silicone emulsion. Finally, a support C3BSi was obtained using the same procedure as the above catalysts but using an aqueous solution comprising ammonium biborate and Rhodorsil EP1 silicone emulsion and the same operating conditions. A further doped support was prepared by adding fluorine by dry impregnation using a dilute hydrofluoric acid solution so as to deposit about 1% by weight of fluorine onto support C3BSi. After drying overnight at 120° C. and calcining at 550° C. for 2 hours in dry air, doped support C3BSiF was obtained.

The supports C3, C3B, C3Si, C3BSi and C3BSiF prepared above were then dry impregnated with a solution of platinum tetramine chloride $[Pt(NH_3)_4]Cl_2$, then calcined again in air at 550° C. The final platinum content for the finished catalysts, Pt-C3, Pt-C3B, Pt-C3Si, Pt-C3BSi and Pt-C3BSiF, was about 0.6% by weight with respect to the total catalyst weight.

The compositions of the catalysts thus prepared are shown in Table 7.

TABLE 7

Characteristics of Pt-C3 catalysts

| Catalyst | Pt-C3 | Pt-C3B | Pt-C3Si | Pt-C3BSi | Pt-C3BSiF |
|---|---|---|---|---|---|
| $B_2O_3$ (wt %) | 0 | 1.5 | 0 | 1.6 | 1.5 |
| $SiO_2$ (wt %) total | 44.8 | 44.1 | 45.7 | 45.0 | 44.5 |
| F (wt %) | 0 | 0 | 0 | 0 | 0.93 |
| Pt (wt %) | 0.65 | 0.68 | 0.69 | 0.63 | 0.71 |
| Complement to 100%, mainly composed of $Al_2O_3$ (wt %) | 54.5 | 53.72 | 53.61 | 52.77 | 52.36 |

Example 8

Comparison of Catalysts on Improving the Pour Point of a Hydrocracking Residue

The catalyst was evaluated by treating a hydrocracking residue from a vacuum distillate, to prepare an oil base.

The feed used was that described in Example 3.

The catalyst had been reduced in hydrogen at 450° C. before the catalytic test, in situ in the reactor. This reduction was carried out in stages. It consisted of a stage at 150° C. for 2 hours, then an increase of the temperature to 450° C. at a rate of 1° C./min, then a stage of 2 hours at 450° C. During this reduction procedure, the hydrogen flow rate was 1000 liters of $H_2$ per liter of catalyst.

The operating conditions under which the catalytic tests were carried out were as follows: a total pressure of 12 MPa, an hourly space velocity of 1.2 $h^{-1}$ and a hydrogen flow rate of 1000 liters of $H_2$ per liter of feed. The reaction temperatures to obtain 40% gross conversion of 380° compounds are shown in Table 8.

The gross conversion is as defined in Example 3.

TABLE 8

Conversion temperature to obtain 40% gross conversion

|  | Pt-C3 | Pt-C3B | Pt-C3Si | Pt-C3BSi | Pt-C3BSiF |
|---|---|---|---|---|---|
| T ° C. | 350 | 347 | 344 | 344 | 341 |

Table 8 shows that the catalysts of the invention, Pt-C3B, Pt-C3Si, Pt-C3BSi and Pt-C3BSiF are more active than non doped catalyst Pt-C3.

Table 9 shows the yields for oil bases for a pour point of −15° C.

TABLE 9

Oil yield (weight %) for pour point of −15° C.

|  | Pt-C3 | Pt-C3B | Pt-C3Si | Pt-C3BSi | Pt-C3BSiF |
|---|---|---|---|---|---|
| Oil yield (weight %) | 67 | 67.5 | 68 | 71 | 72 |

Table 9 shows that the catalysts of the invention, Pt-C3B, Pt-C3Si, Pt-C3BSi and Pt-C3BSiF, lead to higher oil yields than non doped catalyst Pt-C3.

What is claimed is:

1. A process for reducing the pour point of a hydrocarbon-containing feed, comprising contacting said feed with a catalyst comprising at least one matrix, at least one MTT, TON or FER zeolite, at least one hydro-dehydrogenating element, and at least one promoter element by which is boron, silicon or phosphorous, and is deposited on the matrix.

2. A process according to claim 1, in which the catalyst also contains at least one group VIIA element.

3. A process according to claim 1, in which the hydro-dehydrogenating element is a group VIII or group VIB element.

4. A process according to claim 3, wherein the hydro-dehydrogenating element is platinum and/or palladium.

5. A process according to claim 1, in which the zeolite is NU-10, EU-13 or NU-23 zeolite.

6. A process according to claim 1, in which the noble hydro-dehydrogenating element(s) is/are in the metal form.

7. A process according to claim 1, in which the catalyst also contains at least one group VIIB element.

8. A process according to claim 1, carried out at 170–500° C., 1–250 bars, and at an hourly space velocity of 0.05–100 $h^{-1}$, in the presence of hydrogen in an amount of 50–2000 l/l of feed.

9. A catalyst comprising at least one matrix, at least one MTT, TON or FER zeolite, at least one hydro-dehydrogenating element and a silicon, boron or phosphorous promoter deposited on the matrix.

10. A catalyst according to claim 9, also containing at least one group VIIA element.

11. A catalyst according to claim 9, in which the hydro-dehydrogenating element is a group VIII or group VIB element.

12. A catalyst according to claim 9, containing platinum and/or palladium.

13. A catalyst according to claim 9, also containing deposited boron and/or phosphorous.

14. A catalyst according to claim 9, in which the hydro-dehydrogenating element(s) is/are in the metal form.

15. A catalyst according to claim 9, in which the zeolite is NU-10, EU-13 or NU-23 zeolite.

16. A catalyst according to claim 9, also containing at least one group VIIB element.

17. A hydrocarbon conversion process comprising subjecting a hydrocarbon feed to effective conversion conditions, in the presence of a catalyst comprising contacting said feed with a catalyst comprising at least one matrix, at least one MTT, TON or FER zeolite at least one hydro-dehydrogenating element, and at least one promoter element which is boron, silicon or phosphorous, and is deposited on the matrix.

18. A process according to claim 1, wherein the promoter is silicon and optionally boron or phosphorous.

19. A catalyst according to claim 9, wherein the promoter is silicon and optionally boron or phosphorous.

* * * * *